E. W. ALLEN.
Corn Planter.
No. 76,689. Patented April 14, 1868.
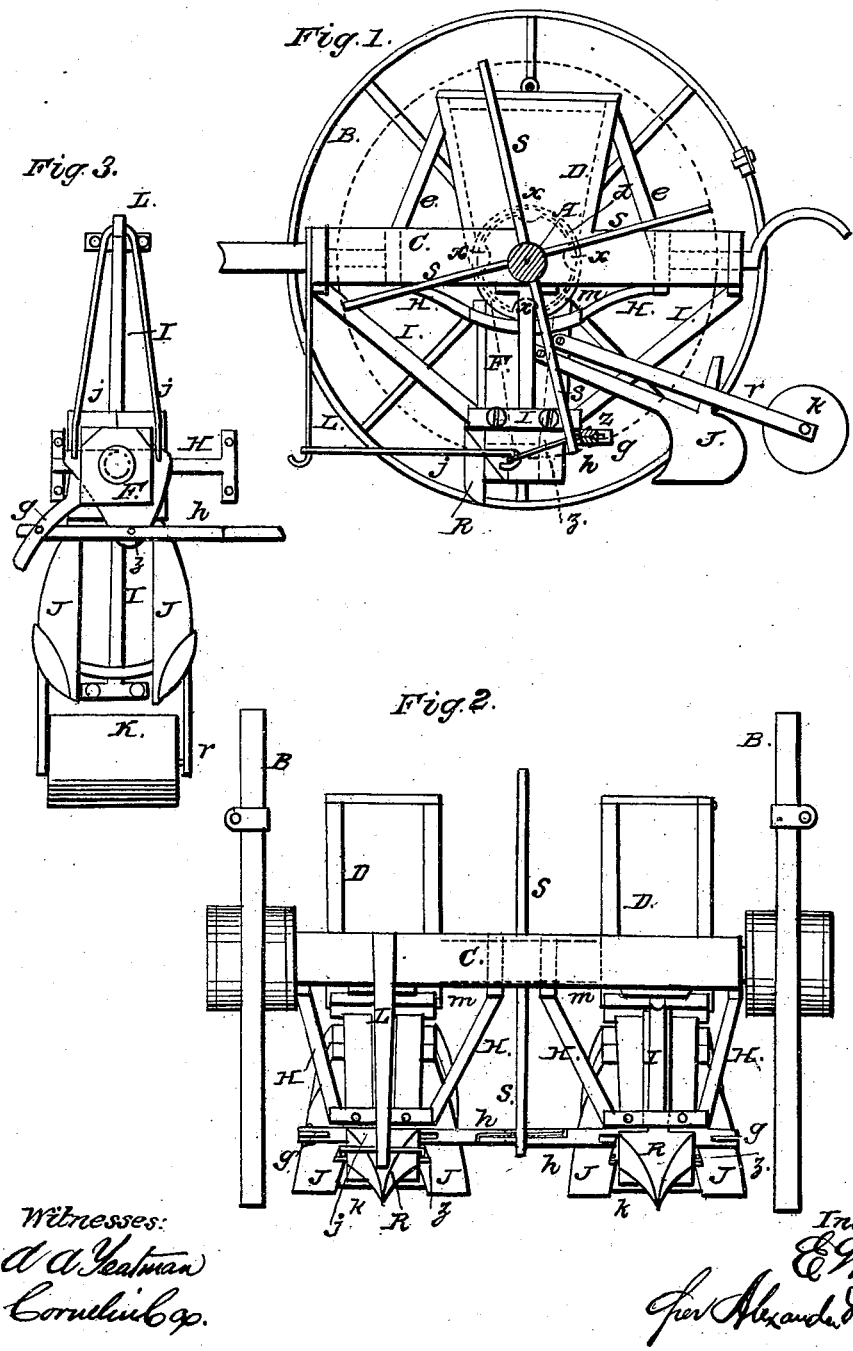

United States Patent Office.

E. W. ALLEN, OF AUBURN, NEW YORK.

Letters Patent No. 76,689, dated April 14, 1868.

---

IMPROVEMENT IN CORN-PLANTERS.

---

The Schedule referred to in these Letters Patent and making part of the same.

---

TO ALL WHOM IT MAY CONCERN:

Be it known that I, E. W. ALLEN, of Auburn, in the county of Cayuga, and in the State of New York, have invented new and useful Improvements in Corn-Planters; and do hereby declare that the following is a full, clear, and exact description thereof, reference being had to the accompanying drawings and the letters of reference marked thereon.

In the annexed drawings, making a part of this specification—

Figure 1 represents a section, and

Figure 2 represents a front view of my "corn-planter," and

Figure 3 represents a bottom view of the seed-spout, plough, and roller-attachment of one side, and the hoops and braces thereto.

In the annexed drawings, A represents the shaft or axle, and B B the wheels, rigidly secured thereto, of my machine. The axle A is made of any suitable material and dimensions, and is provided with one or more collars $d$, in which are suitable recesses or depressions $x$ $x$.

C represents a suitable frame, having bearings, and loosely adjusted on the shaft or axle A, as shown in the drawings.

Directly over, and fitting closely over and around the top of the collars $d$, are hoppers, D D, made of suitable size, and securely held in place by means of braces $e$ $e$ extending from said hoppers to the frame C, as shown. The collars $d$ are enclosed or embraced in a metallic casing, $m$, which is provided with suitable openings at the top and bottom thereof for the seed or grain to pass in and out. Beneath the collar $d$ and metallic casing $m$ is secured or adjusted a suitable spout, F. Said spout is held firmly in its place by means of metallic clasps and braces H and I, said clasps and braces being made and adjusted substantially in the form and manner shown in the drawings, the outer ends of the arms or braces being screwed or bolted to the under side of the frame.

R represents a plough or nose, the shank of which extends up in front of the spout F, and is firmly held between said spout and clasps H and I, the lower end extending a suitable distance below the bottom of said spout and the wheels B B, so as to form a drill or furrow, in which the seed may fall. The spout F has a suitable notch or slot cut near its lower end, in which the plate $z$ works.

$g$ represents an arm, secured to the outside of the spout F, provided with a slot, in which is pivoted the lever $h$. The lever $h$ is also pivoted to and operates the plate $z$.

J represents a metallic scoop or coverer, the sides of which are connected and held firm by means of a curved rod, forming a part thereof. The scoop or coverer is pivoted through its arms to the spout F, and is designed to cover the seed or grain after it has been dropped.

K represents a roller, secured between arms $r$ $r$, which are pivoted or hinged to the spout F, and follows directly behind the scoop or coverer J, for the purpose of pressing down the earth after it has been drawn over the seed by means of said scoop.

Fastened to or extending through the shaft or axle A are a suitable number of arms S S, which revolve with said shaft. These arms correspond in number with the depressions X X in the collars $d$.

L represents a spring, secured to and projecting down from the front part of the frame C. To the bottom or lower end of the spring L is attached a pitman or connecting-rod, $j$, which is hooked into or attached to the movable plate $z$.

It will readily be seen that seed or corn placed in the hoppers D D will fill the depressions X X, and be carried around in said depressions to the under side of the collar $d$, when it will drop down into the spout F and on the plate $z$. It will also be seen that the arms, $s$ $s$, will strike and throw back the levers $h$ $h$, and thereby the plate $z$, when the seed or corn will fall into the furrow directly behind the plough R. The plate $z$ is readily and quickly drawn back into its place by means of the spring L and connecting-rod $j$, where it remains until again withdrawn or thrown out by means of another arm S and the lever $h$.

It will thus be seen that the corn or grain may be planted in hills, and at any desired distance apart; the distance apart being regulated by the number of depressions X X and arms S S, and the size of the drive and carriage B B.

O O represent lugs or markers, attached to the rim or felloes of the wheels B B, for the purpose of marking or indicating to the operator the position of the hills in the rows, and thereby enable him to plant in "check-rows."

The indicator O will, for instance, show the location of every fourth hill, and the rim of the wheel B being one-half the width of a row, or the distance the rows are apart from the plough or nose R, will be run in the same track when returning, and said indicator or marker may be kept so as to fall or strike in the same places already marked, by which means the rows may be kept true both ways.

Having thus fully described my invention, what I claim as new, and desire to secure by Letters Patent, is—

1. Operating the movable plates $z$ $z$ by means of the revolving arms S S, levers $h$ $h$, and spring L, with its connecting-rod $j$, the several parts being constructed and arranged substantially as and for the purposes herein set forth.

2. The combination of the ploughs R, double coverers J J, rollers K, spouts F, and movable plates $z$, operated by the reel-arms S S, springs L, and rod $j$, the whole constructed and used substantially as specified.

In testimony that I claim the foregoing, I have hereunto set my hand, this 27th day of March, 1868.

E. W. ALLEN.

Witnesses:
V. D. STOCKBRIDGE,
A. N. MARR.